United States Patent
Lonco et al.

(10) Patent No.: US 9,810,362 B2
(45) Date of Patent: Nov. 7, 2017

(54) PERMEATE COLLECTION FITTING

(75) Inventors: Nevena Lonco, Guelph (CA); Constantin Jurjut, Guelph (CA)

(73) Assignee: General Electric Company, Schenectady, NY (US)

(*) Notice: Subject to any disclaimer, the term of this patent is extended or adjusted under 35 U.S.C. 154(b) by 681 days.

(21) Appl. No.: 13/250,767

(22) Filed: Sep. 30, 2011

(65) Prior Publication Data

US 2013/0081722 A1 Apr. 4, 2013

(51) Int. Cl.
*F16L 41/02* (2006.01)
*B01D 61/02* (2006.01)
*B01D 61/10* (2006.01)
*F16L 41/03* (2006.01)
*F16L 47/32* (2006.01)

(52) U.S. Cl.
CPC .......... *F16L 41/021* (2013.01); *B01D 61/025* (2013.01); *B01D 61/10* (2013.01); *F16L 41/03* (2013.01); *F16L 47/32* (2013.01); *B01D 2313/13* (2013.01); *B01D 2317/04* (2013.01); *Y10T 137/87249* (2015.04)

(58) Field of Classification Search
CPC ....... F16L 41/021; F16L 41/008; F16L 45/00; F16L 41/03
USPC ....... 285/133.11, 126.1, 129.1, 133.5, 125.1, 285/129.2, 133.21, 133.3, 133.4
See application file for complete search history.

(56) References Cited

U.S. PATENT DOCUMENTS

| | | | |
|---|---|---|---|
| 3,850,459 A * | 11/1974 | Blumenkranz | F16L 47/32 285/133.3 |
| 4,626,346 A * | 12/1986 | Hall | 210/110 |
| 4,726,399 A * | 2/1988 | Miller | 137/884 |
| 4,761,295 A * | 8/1988 | Casey | 426/549 |
| 5,346,621 A | 9/1994 | Haworth et al. | |
| 5,992,904 A * | 11/1999 | Hitachi et al. | 285/332 |
| 6,524,472 B2 * | 2/2003 | Monroe | 210/90 |
| 6,632,356 B2 | 10/2003 | Hallan et al. | |
| 7,063,788 B2 | 6/2006 | Mahendran et al. | |
| 7,507,334 B1 * | 3/2009 | Sigona | 210/196 |
| 7,537,701 B2 | 5/2009 | Mahendran et al. | |
| 7,714,035 B1 | 5/2010 | Coe | |
| 7,793,684 B2 * | 9/2010 | Gaignet et al. | 137/563 |
| 8,377,385 B2 * | 2/2013 | Long | 422/186.18 |
| 2007/0262029 A1 | 11/2007 | Yoshida et al. | |
| 2008/0048438 A1 * | 2/2008 | Weise et al. | 285/125.1 |
| 2009/0314703 A1 | 12/2009 | Beach et al. | |
| 2010/0282676 A1 | 11/2010 | Liberman et al. | |

(Continued)

FOREIGN PATENT DOCUMENTS

AU 2007202582 A1 1/2008
CN 101332412 A 12/2008

(Continued)

OTHER PUBLICATIONS

Axeon Water Technologies, Reverse Osmosis User's Manual, 2011.*

(Continued)

*Primary Examiner* — James M Hewitt

(57) ABSTRACT

Fittings include a conduction section, a coupling groove and an access port. One fitting also includes a socket section. The conduction section may be connected to receive permeate fluid from a reverse osmosis pressure chamber and the socket section may be connected in parallel with other fittings to form a permeate collection manifold system.

9 Claims, 3 Drawing Sheets

(56) References Cited

U.S. PATENT DOCUMENTS

| | | |
|---|---|---|
| 2011/0042294 A1 | 2/2011 | Bonta et al. |
| 2011/0284480 A1 | 11/2011 | Karabelas et al. |

FOREIGN PATENT DOCUMENTS

| | | |
|---|---|---|
| CN | 201231137 Y | 5/2009 |
| CN | 101939263 A | 1/2011 |
| DE | 19934574 A1 | 2/2001 |
| EP | 1870625 A1 | 12/2007 |

OTHER PUBLICATIONS

Search Report and Written Opinion from corresponding PCT Appication No. PCT/US2012/053411 dated Apr. 23, 2013.
MAR COR Purification—A Cantel Medical Company, 23G-Series Reverse Osmosis System—Operation and Maintenance Manual, Jul. 13, 2007.
Aquacare, Reverse Osmosis Systems Desalination, Jul. 2004.
Office Action issued in CN Application No. 201280047676.5 dated Mar. 2, 2015.
Shenzhen Aoliyuan Environment, English language abstract of CN201231137, published May 6, 2009.
Victaulic Company, Victaulic General Catalog, Oct. 2011.
A.J. Antunes & CO. Antunes Filtration Technologies; Installation Instructions, AFT Expansion Tank Kit P/N 7000472, Jun. 2005.
IDE Technologies LTD, English language abstract of CN101939263, published Jan. 5, 2011.
Office Action issued on related Chinese Application No. 201280047676.5 dated Aug. 25, 2016.

* cited by examiner

PERMEATE COLLECTION FITTING

FIELD

The present disclosure relates generally to a hydraulic fitting and in particular a fitting for use in a membrane filtration system.

BACKGROUND

The following discussion is not an admission that anything discussed below is citable as prior art or common general knowledge.

Membrane systems are used to produce purified water, also referred to as permeate. An associated waste, also referred to as retentate, concentrate or brine is also produced. Some membrane systems include a source of pressurized feed water, semi-permeable membranes and a collection system. Large scale membrane systems may house multiple pressure chambers, each chamber housing one or more membrane elements, such as spiral wound reverse osmosis membrane elements. Large scale collection systems include a permeate collection manifold and a retentate collection manifold. These large scale collection systems are comprised of various parts such as pipes, tubes, fittings, valves, and the like, of various dimensions.

Each large membrane system can use a different number of pressure chambers. Furthermore, the pressure chambers can be of different dimensions and arranged in various orientations. Therefore, each large scale collection system is designed and constructed on a case-by-case basis to meet the requirements of each large scale membrane system. The case-by-case construction of the collection system is highly work and time intensive and requires a large number of parts, of varying dimensions, to meet the design requirements.

SUMMARY

Fittings, to be discussed in further detail below, may be connected to the feed water inlet, retentate outlet or permeate outlet of a membrane pressure chamber. When the fittings are connected to the permeate outlet, the fittings conduct the permeate fluid away from the pressure chamber. One fitting includes a two-ended socket section as well as a conduction section. The two ends of the socket section may be connected with other elements of a permeate manifold collection system.

The fittings may also include a sampling port.

The fittings can be used with various membrane systems and various collection systems. The fittings decrease the total number of individual parts that are required to construct a collection manifold system. The reduced number of individual parts increases the efficiency and accuracy of the construction process.

Optionally, the socket section has a larger cross-sectional diameter than the conduction section to ensure that flow rates in a permeate collection manifold system do not impair the balance of pressures across the reverse osmosis process.

DETAILED DESCRIPTION

Figure 1:
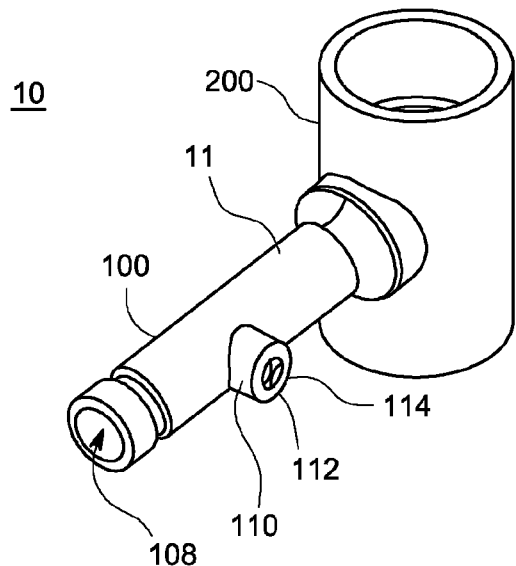
FIG. 1 is an isometric view of a first fitting.
Figure 2:
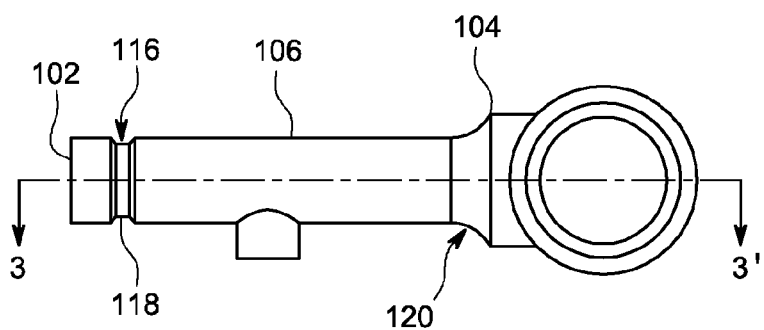
FIG. 2 is a top view of the fitting of FIG. 1.
Figure 3:
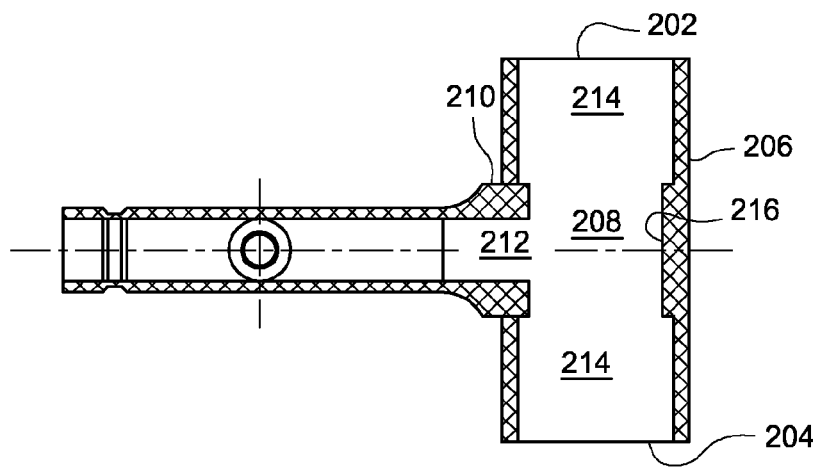
FIG. 3 is a cross-sectional side view of the fitting of FIG. 1 taken through line 3-3' of FIG. 2.

FIGS. 1 to 3 show a first fitting 10. The fitting 10 has a conduction section 100 and a socket section 200. Both of the conduction section 100 and the socket section 200 are generally tubular with a circular cross-section.

The conduction section 100 has an inlet end 102, an outlet end 104 and a tubular body 106 that defines an inlet bore 108.

The conduction section 100 includes a groove 116 that is positioned between the inlet end 102 and the outlet end 104. The groove 116 extends around the outer surface of the tubular body 106. The groove 116 does not extend through the entirety of the tubular body 106 to the inlet bore 108. Rather, the groove 116 includes a floor 118 that prevents the exchange of fluid between the groove 116 and the inlet bore 108. As will be discussed further below, the groove 116 can receive a corresponding ridge of a coupling member 310.

As depicted in FIG. 1, the conduction section 100 includes an access port extension 110 that is positioned between the groove 116 and the outlet end 104. The access port extension 110 extends away from the tubular body 106. The access port extension 110 has a generally circular cross-section with an outer diameter and an inner diameter. The inner diameter of the access port extension 110 defines an access port 112. The access port 112 extends through the access port extension 110 and through the tubular body 106 to establish fluid communication with the inlet bore 108. The access port extension 110 is adapted for connecting a peripheral device 314 (shown in FIG. 4). Optionally, the access port extension 110 is threaded and allows a threaded sampling tap to connect to the access port extension 110. With the sampling tap a user can selectively obtain samples of the fluid within the inlet bore 108. Other possible peripheral devices include: flow meters; pressure transducers; chemical sensors; and the like.

The conduction section 100 also includes a transition section 120 positioned at the outlet end 104. As shown in FIG. 2, the transition section 120 includes a flange at the outer surface of the outlet end 104. The transition section 120 causes the outer diameter at the outlet end 104 to be comparatively larger than the inlet end 102. The larger outer diameter at the outlet end 104 increases the cross-sectional area between the inner and outer diameter of the conduction section 100 at the outlet end 104. The increased cross-sectional area at the outlet end 104 is unitary with a support extension 210 of the socket section 200, as described below. The transitional section 120 and the support extension 210 provide structural support to the fitting 10.

The socket section 200 has a first end 202, a second end 204 and a tubular body 206 that defines a manifold bore 208.

The inner diameter of the conduction section 100 can be different from the inner diameter of the socket section 200. For example, the inlet bore 108 may have a diameter that is less than the manifold bore 208. Optionally, the conduction section 100 is sized to connect with standard 1 inch pipes and fittings and the socket section 200 is sized to connect with standard pipes and fittings in the range of 1 to 5 inches.

The first and second ends 202, 204 of the socket section 200 optionally include a socket coupling. The socket coupling is a region 214 of the socket section 200 that has a larger inner diameter than the manifold bore 208. As shown in FIG. 3, the boundary of the region 214 and the manifold bore 208 includes a shoulder 216 that extends from the inner surface of the tubular body 206. The shoulder 216 acts as a depth stop for an additional element of a permeate collection manifold system 350 that is connected to either or both of the first and second ends 202, 204 of the socket section 200.

The fitting 10 is preferably composed of materials that are suitable for use with potable water. Various thermoplastic polymers are suitable, for example polyvinylchloride. The use of thermoplastic polymers also facilitates an injection molding fabrication process. The fitting 10 is manufactured as one unitary piece, from a single mold.

Figure 5:
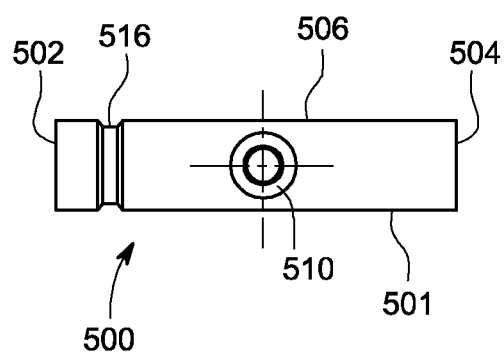
FIG. 5 is a side view of a second fitting.

FIG. 5 depicts a second fitting 500. The fitting 500 is similar to the conduction section 100 of the first fitting 10 and has the same dimensions except its overall length. The fitting 500 is comprised of an inlet end 502, an outlet end 504, a tubular body 506, a groove 516 and an access port extension 510. The tubular body 506 defines an inlet bore (not shown) of the fitting 500. The groove 516 is similar to groove 116. The groove 516 is positioned between the inlet end 502 and the outlet end 504. The groove 516 is the same distance from inlet end 502 as the groove 116 is from the inlet end 102 on fitting 10. The groove 516 is adapted to receive the corresponding ridge of a coupling member 310. The access port extension 510 is the same as the access port 110 of fitting 10. For example, the access port extension 510 is adapted for connecting a peripheral device 314 and the access port extension 510 can be spaced the same distance from the groove 516 as the access port extension 110 is spaced from the groove 116 on fitting 10.

The fitting 500 can be manufactured from similar suitable thermoplastic polymers as the fitting 10. The fitting 500 can be manufactured by injection molding fabrication from a single mold. The mold can be designed such that the distance between inlet end 502 and outlet end 504, which defines the axial length of the fitting 500, is excessive relative to the first fitting 10. The excessive axial length of fitting 500 permits the operator to cut the fitting 500 at the outlet end 504 to meet the requirements of a given permeate collection manifold system 350 that also include first fittings 10.

In operation, the inlet end 102 of fitting 10 can be connected to the permeate outlet of a reverse osmosis pressure chamber as described in more detail below. The connection between the inlet end 102 and the permeate outlet can be made by the groove 116 receiving the coupling member. These types of coupling fittings are known and generically referred to as grooved end fittings or are known under the name Victaulic™ fittings. The coupling member ensures a suitable seal at the groove 116 to establish a fluid flow path from the permeate outlet to the manifold bore 208 of the socket section 200. This fluid flow path passes through the inlet bore 108 of the conduction section 100 and through the inlet port 212 to the manifold bore 208.

The first and second end 202, 204 of the manifold bore 208 are connected with additional elements to form a permeate collection tree as described in more detail below. The additional elements can include elbow fittings, connection pipes, tee joints and the like. These additional elements can be in fluid communication with the manifold bore 208 of each fitting 10. The additional elements can be of various dimensions, depending upon the requirements of the permeate collection manifold system. One requirement of the permeate collection manifold system can be that the center of the manifold bore 208 is substantially aligned with the center of the additional elements. The operator can cut the fitting 500 at the outlet end 504 to ensure the center of an additional element is substantially aligned with the center of the manifold bore 208.

When assembled, the additional elements and the fittings 10 constitute the permeate collection tree. The permeate collection tree is connected to a permeate collection pipe. The additional elements and the permeate collection pipe may be made of the same, or similar, thermoplastic polymers as the fitting 10.

Figure 4:
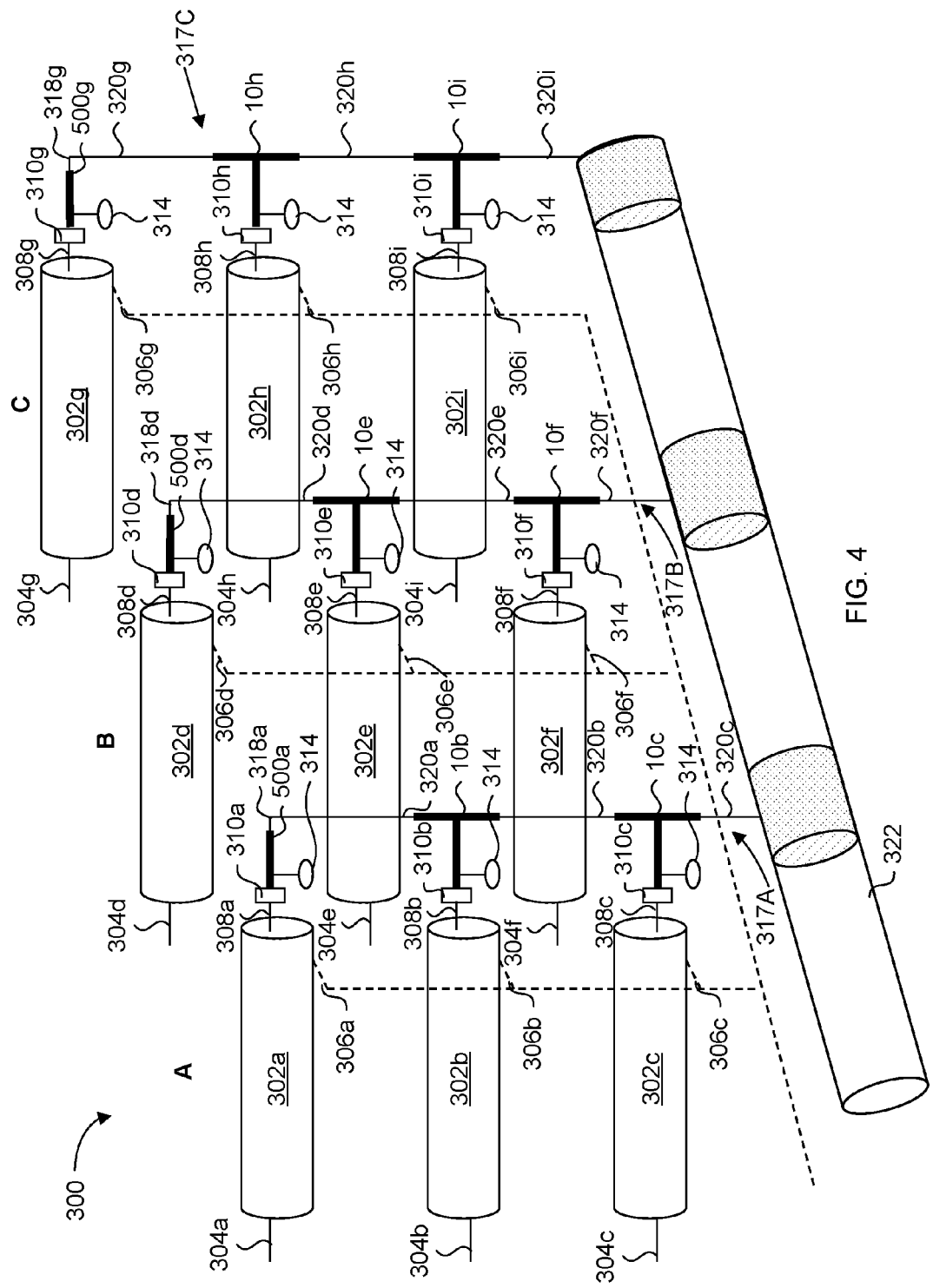
FIG. 4 is a schematic drawing of a reverse osmosis permeate collection manifold system.

A reverse osmosis system 300 can include a plurality of reverse osmosis pressure chambers 302a-302i. Nine such chambers are shown in FIG. 4. Each reverse osmosis pressure chamber 302a-302i includes a feed water inlet 304a-304i, a retentate outlet 306a-306i, a permeate outlet 308a-308i and at least one membrane element (not shown). The retentate outlets 306a-306i and an example retentate collection system are shown as a dotted line in FIG. 4.

In FIG. 4, the nine reverse osmosis pressure chambers 302a-302i are shown arranged with three chambers in a parallel, vertical set, with three such vertical sets (shown as sets A, B and C in FIG. 4). With reference to set A, the reverse osmosis pressure chamber 302a is positioned at the top of the vertical set, the reverse osmosis pressure chamber 302b is in the middle of the vertical set and the reverse osmosis pressure chamber 302c' is positioned at the bottom of the vertical set. Reverse osmosis pressure chambers 302b, 302c, 302e, 302f, 302h, and 302i are Each Connected at the permeate outlet 308b, 308c, 308e, 308f, 308h, and 308i to a respective fitting 10b, 10c, 10e, 10f, 10h, and 10i. The fittings 10b and 10c are part of the permeate collection tree 317A, the fittings 10e and 10f are part of the permeate collection tree 317B, and the fittings 10h and 10i are part of the permeate collection tree 317C that provides fluid flow to the permeate collection pipe 322 for each vertical set of reverse osmosis pressure chambers 302a-302i.

The reverse osmosis pressure chambers 302a, 302d, and 302q are connected at the permeate outlets 308a, 308d, and 308e to a respective fitting 500a, 500d, and 500q that is connected to an respective elbow fitting 318a, 318d, 318q. The elbow fittings 318a, 318d, 318q are connected to the respective permeate collection tree 317A, 317B, 317C via the respective connection pipes 320a, 320d, 320e. The connection pipes 320a, 320d, 320e are connected to the respective first end 202b, 202e, and 202h of the socket section of the respective fitting 10b, 10e, and 10h. The operator can substantially align the center of the elbow fittings 318a, 318d, 318q and the center of the respective connection pipe 320a, 320d, 320q with the center of manifold bore of the respective fittings 10b, 10e, 10h by cutting the axial length of the respective fitting 500a, 500d, 500g. The second end of the socket section of each of the fittings 10b, 10e, 10h is connected to respective connection pipes 320b, 320e, 320h which are connected to the respective first ends of the socket section of the fittings 10c, 10f, 10i. The second end of fittings 10c, 10f, 10i are connected, via respective connection pipes 320c, 320f, 320i to a permeate collection pipe 322, for example by a tee joint (not shown) or another elbow fitting (not shown) depending upon which respective permeate collection tree 317A to 317C each fitting 10c, 10f, 10i is a member of (see vertical set A in comparison to vertical set C in FIG. 4).

Alternatively, as shown in set C of FIG. 4, the second end of the fitting 10i can be connected to a connection pipe 320i and the connection pipe 320i is connected to a tee section. The tee section includes a manifold portion that is in vertical fluid communication with the fitting 10i. The manifold portion of the tee section can have a larger inner and outer diameter than the manifold bore of fitting 10i. Therefore, the operator can connect a fitting 500g to the permeate outlet 308g of the reverse osmosis pressure chamber 302g. The operator can cut the fitting 500g, at the outlet end, so the center manifold bore of fitting 10i is substantially aligned with the center of the manifold portion of the tee section.

Each of the three vertical sets of the chambers 302a-302i in the reverse osmosis system 300 are connected with a respective permeate collection tree 317A-317C through which each vertical set is connected to the permeate collection pipe 322.

Alternatively, the reverse osmosis pressure chambers 302a-302i can be arranged in a parallel, horizontal sets. When the reverse osmosis pressure chambers 302a-302i are arranged in parallel horizontal set, the manifold bore of each socket section of the fittings 10b, 10c, 10e, 10f, 10h, and 10i within the permeate collection manifold system 300 is similarly horizontally oriented. The horizontal orientation of the socket sections allows for collection of permeate from multiple, reverse osmosis pressure chambers 302a-302i at the same elevation, for example between reverse osmosis pressure chambers 302a, 302d and 302g (as shown in FIG. 4). The permeate from the reverse osmosis pressure chambers 302a, 302d and 302g can be directed to a vertical permeate collection pipe 322.

The manifold bore of each socket section of the fittings 10b, 10c, 10e, 10f, 10h, and 10i could also be oriented between a horizontal and vertical position, for example a diagonal position. For example, the permeate from the reverse osmosis pressure chamber 302d could be in communication with the manifold bore of socket section of the fitting 10b connected to a pressure chamber 302b.

The system 300 is not limited to the total number of reverse osmosis pressure chambers 302a-302i shown in FIG. 4. The fitting 10 is useful for any permeate collection manifold system 300 that is designed to collect the permeate from more than one reverse osmosis pressure chamber 302a-302i.

The use of the terms "connected" and "connection" includes all suitable techniques for connecting and sealing thermoplastic pipes and fittings such as: solvent cement glue; fusion welding; joints; flanges; compression members; threading; and, infrared welding.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

What is claimed is:

1. A set of fittings for a permeate collection manifold system of a membrane filtration system, comprising:
   a first fitting comprising:
      a socket section having a socket body that defines a manifold bore that extends between a first open end and a second open end of the socket body;
      a conduction section having a conduction body that defines an inlet bore extending between an inlet end and an outlet end of the conduction body, wherein the outlet end of the conduction body is coupled to the socket body such that the conduction body perpendicularly extends from the socket section and the inlet bore is in fluid communication with the manifold bore; and
      a first access port extension having a first access port body that defines a first access port bore extending between an open inner end and an open outer end of the first access port body, wherein the inner end is coupled to the conduction body such that the first access port body perpendicularly extends from the conduction body and the first access port bore and the inlet bore are in fluid communication;
      wherein the socket body comprise a socket coupling region having an inner diameter of the manifold bore in the socket coupling region greater than the inner diameter of the manifold bore out of the socket coupling region; and
   a second fitting comprising:
      a second fitting body having a first open end, a second open end and a first bore that extends between the first and second open ends, the second open end of the second fitting body being cylindrical with a constant outside diameter;
      a second access port extension having a second access port body that defines a second access port bore extending between an open inner end and an open outer end of the second access port body, wherein the inner end of the second access port body is coupled to the second fitting body such that the second access port body perpendicularly extends from the second fitting body and the second access port bore and the second bore are in fluid communication
   wherein the length of the second fitting is greater than the length of the inlet bore of the first fitting,
   wherein the conduction body further comprises an annular groove distanced from the open outlet end for receiving a coupling member in communication with the open inlet end; and
   wherein the second fitting body further comprises an annular groove positioned external to the first bore for receiving a coupling member in communication with the first end.

2. The set of fittings of claim 1, wherein the socket section, the conduction section, and the first access port extension of the first fitting, and the second fitting body and the second port extension of the second fitting, are each unitary pieces.

3. The set of fittings of claim 1, wherein a diameter of the first access port bore of the first fitting is substantially the same as a diameter of the second access port bore of the second fitting.

4. A collection manifold system, comprising:
   at least a first pressure chamber and a second pressure chamber, each pressure chamber including a chamber outlet; and
   a collection tree comprising:
      at least a first fitting and a second fitting;
      an elbow fitting; and,
      a connection pipe,
      wherein the first fitting comprises:
         a socket section having a socket body that defines a manifold bore that extends between a first open end and a second open end of the socket body;
         a conduction section having a conduction body that defines an inlet bore extending between an inlet end and an outlet end of the conduction body, wherein the outlet end of the conduction body is coupled to the socket body such that the conduction body perpendicularly extends from the socket section and the inlet bore is in fluid communication with the manifold bore, and wherein the outlet end of the conduction body includes a flange such that an outer diameter of the conduction body is larger at the outlet end than at the inlet end for providing structural support at the outer end of the conduction body; and a first access port extension having a first access port body that defines a first access port bore extending between an open inner end and an open outer end of the first access port body, wherein the inner end is coupled to the conduction body such that the first access port body perpendicularly extends from the conduction body and the first access port bore and the inlet bore are in fluid communication; and wherein the outlet end of the conduction section extends into the manifold bore of the socket section defining a shoulder such that the first open end and the second open end of the socket body comprise a socket coupling region having an inner diameter of the manifold bore in the socket coupling region greater than the inner diameter of the manifold bore out of the socket coupling region, the shoulder for providing a depth stop for an additional element connected to either of the first open end or the second open end; and wherein the second fitting comprises:
  a second fitting body having a first open end, a second open end and a first bore that extends between the first and second open ends;
  a second access port extension having a second access port body that defines a second access port bore extending between an open inner end and an open outer end of the second access port body, wherein the inner end of the second access port body is coupled to the second fitting body such that the second access port body perpendicularly extends from the second fitting body and the second access port bore and the first bore are in fluid communication;

wherein the second open end of the second fitting is coupled to the open first end of the socket section of the first fitting by way of the elbow fitting and the connection pipe such that the first bore of the second fitting is in fluid communication with the manifold bore of the first fitting; and wherein the chamber outlet of the first pressure chamber is connected to the first open end of the second fitting and the chamber outlet of the second pressure chamber is connected to the inlet end of the conduction section of the first fitting.

5. The collection manifold system of claim 4, wherein the at least two pressure chambers are arranged with their outlets in a substantially vertical plane.

6. The collection manifold system of claim 4, wherein the socket section, the conduction section, and the first access port extension of the first fitting is a first unitary piece and the second fitting body and the second port extension of the second fitting is a second unitary piece.

7. The collection manifold system of claim 4, wherein the first access port bore of the first fitting is substantially parallel with the second access port bore of the second fitting.

8. The collection manifold system of claim 4, further comprising a grid of pressure chambers having at least two sets of pressure chambers, each set of pressure chambers having at least a first pressure chamber and a second pressure chamber and a collection tree that connects all of the outlets of the first and second pressure chambers in the set with the collection pipe.

9. The permeate collection manifold system of claim 4, wherein the at least first and second pressure chambers each house at least one reverse osmosis membrane element.

* * * * *

UNITED STATES PATENT AND TRADEMARK OFFICE
CERTIFICATE OF CORRECTION

PATENT NO. : 9,810,362 B2
APPLICATION NO. : 13/250767
DATED : November 7, 2017
INVENTOR(S) : Nevena Lonco and Constantin Jurjut It is certified that error appears in the above-identified patent and that said Letters Patent is hereby corrected as shown below:

In the Specification

In Column 4, Line 34, please amend:
-- 302q are connected at the permeate outlets 308a, 308d, and --
And correct error to read:
-- 302g are connected at the permeate outlets 308a, 308d, and --

In Column 4, Line 35, please amend:
-- 308e to a respective fitting 500a, 500d, and 500q that is --
And correct error to read:
-- 308e to a respective fitting 500a, 500d, and 500g that is --

In Column 4, Line 36, please amend:
-- connected to an respective elbow fitting 318a, 318d, 318q, --
And correct error to read:
-- connected to an respective elbow fitting 318a, 318d, 318g. --

In Column 4, Line 37, please amend:
-- The elbow fittings 318a, 318d, 318q are connected to the --
And correct error to read:
-- The elbow fittings 318a, 318d, 318g are connected to the --

In Column 4, Line 44, please amend:
-- fittings 318a, 318d, 318q and the center of the respective --
And correct error to read:
-- fittings 318a, 318d, 318g and the center of the respective --

Signed and Sealed this
Fifth Day of June, 2018

Andrei Iancu
*Director of the United States Patent and Trademark Office*

CERTIFICATE OF CORRECTION (continued)
U.S. Pat. No. 9,810,362 B2

In Column 4, Line 45, please amend:
-- connection pipe 320a, 320d, 320q with the center of mani- --
And correct error to read:
-- connection pipe 320a, 320d, 320g with the center of mani- --